United States Patent
Malomsoky et al.

(10) Patent No.: US 9,008,682 B2
(45) Date of Patent: Apr. 14, 2015

(54) PERFORMANCE MONITORING OF LOCATION-BASED SERVICE IN A MOBILE TELECOMMUNICATIONS NETWORK

(75) Inventors: Szabolcs Malomsoky, Szentendre (HU); Tamás Varga, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1714 days.

(21) Appl. No.: 12/279,032

(22) PCT Filed: Feb. 10, 2006

(86) PCT No.: PCT/SE2006/050007
§ 371 (c)(1),
(2), (4) Date: Aug. 11, 2008

(87) PCT Pub. No.: WO2007/091934
PCT Pub. Date: Aug. 16, 2007

(65) Prior Publication Data
US 2009/0047977 A1   Feb. 19, 2009

(51) Int. Cl.
*H04W 24/08* (2009.01)
*H04W 4/02* (2009.01)
*H04W 64/00* (2009.01)

(52) U.S. Cl.
CPC ............. *H04W 24/08* (2013.01); *H04W 4/02* (2013.01); *H04W 64/00* (2013.01)

(58) Field of Classification Search
CPC ........ H04W 24/08; H04W 4/02; H04W 64/00
USPC ........... 455/456.1–457, 402.2, 405–408, 420, 455/432.1–453
See application file for complete search history.

(56) References Cited

U.S. PATENT DOCUMENTS 6,807,156 B1    10/2004 Veres
6,915,139 B2 *   7/2005 Hamabe ................. 455/522
(Continued)

FOREIGN PATENT DOCUMENTS

WO    WO 2004/070513 A2    8/2004
WO    WO 2005/032186 A1    4/2005

OTHER PUBLICATIONS

C2K-ATS—PLTS for Location-Based Services Testing CDMA; "Position Location Test System (PLTS) is a fully integrated, automated test solution for 1x/EV-DO mobile devices that use Assisted GPS (A-GPS), Advanced Forward Link Trilateration (AFLT), Hybrid (AFLT and A-GPS) or GPS-only technologies"; Spirent Communications; http://www.spirentcom.com/documents/119.pdf.

(Continued)

*Primary Examiner* — Babar Sarwar

(57) ABSTRACT

A method, a device and a system are provided for monitoring Location-based Service of a mobile telecommunications network. A passive monitoring method is applied processing both positioning and Location-based Service information of different interfaces. In the system, a monitoring device is attached at the standard interfaces of the network calculating Key Performance indicators and/or measures of network usage from the combined information. In a preferred embodiment, traffic of Le and Gi interfaces (106, 107) of a 3GPP GPRS network (102) are monitored, however the invention can be applied to both circuit-switched and packet-switched telecommunications network supporting positioning.

31 Claims, 5 Drawing Sheets

(56) References Cited

U.S. PATENT DOCUMENTS 7,770,216 B2 * 8/2010 Blicker et al. ............... 726/12
7,783,299 B2 * 8/2010 Anderson et al. .......... 455/456.1

2003/0006912 A1 * 1/2003 Brescia ...................... 340/990

OTHER PUBLICATIONS

IETF RFC 2616 Hypertext Transfer Protocol HTTP 1.1.

* cited by examiner

PERFORMANCE MONITORING OF LOCATION-BASED SERVICE IN A MOBILE TELECOMMUNICATIONS NETWORK

BACKGROUND OF THE INVENTION

1. Technical Field of the Invention

The present invention relates to performance monitoring of Location-based Service (LBS) in a mobile telecommunications network having nodes providing both positioning information and application information relating to the location of a subscriber accessing over either circuit-switched or packet-switched network. In particular, and not by way of limitation, the present invention is directed to a method, a device and a system for monitoring of LBS for a telecommunications network, such as General Packet Radio Service (GPRS) or CDMA2000 networks.

2. Description of Related Art

LBS is a value-added service of mobile telecommunications networks, such as the GPRS network of the Third Generation Partnership Project (3GPP). LBS systems make use of the Positioning service of the mobile network of the requested subscriber to obtain an estimate of the current geographical location of his/her mobile terminal. The accuracy of the positioning depends on the deployed method in the range from few meters assisted by the Global Positioning System (GPS) to few kilometers in case of cell based methods. Based on the obtained position, the LBS system performs a lookup in a spatial-organized geographic database to locate the specified objects, maps, etc in the neighborhood of the given position and produces the desired output.

Eventually, LBSs are a set of applications running on an LBS server. LBS systems typically support the functions of locating the nearest point-of-interest (POI), e.g. a petrol station, navigating to the selected point-of-interest, and running fleet management and tracking. Each function may produce rich-text, image or animated-image output for the terminal, which renders the information, after optional preprocessing, on its display.

Market success of LBS largely depends on its performance and on the reliability of the provided information. Quick response and up-to-date, valid information are inevitable prerequisites of high penetration. Therefore, continuous performance monitoring in live operation is important. Furthermore, performance monitoring shall provide helpful information for the operator to identify performance bottlenecks of the operating system.

Until now, the accuracy and the performance of the Positioning subsystem were in the major focus and the overall performance of the LBS was not an issue. For example, Spirent's Position Location Test System (PLTS) offers automated active measurement-based accuracy and performance tests for handsets and networks for CDMA2000 systems, as it is described in Spirent Communications, Positioning Location Test System, http://www.spirentcom.com/documents/119.PDF Besides active measurements, each node in the mobile system maintains its own operation logs and a set of counters related to the provided service. These logs and counters are associated with a certain procedure or events performed in the node, which is useful but inadequate for describing the overall performance. For example, the counters "number of successful requests" and "the number of total requests" are maintained at the Gateway Mobile Location Center (GMLC) node, however they cannot be related to individual subscriber requests.

A more detailed view can be established with passive measurements. A monitoring tool described in U.S. Pat. No. 6,807,156 for example, is able to monitor and analyze end-to-end performance and inspect traffic characteristics of packet traffic recorded at one of the standard 3GPP packet interfaces. The method provides means to investigate performance of LBS-related protocols such as Wireless Application Protocol (WAP), Hypertext Transfer Protocol (HTTP) or Transmission Control Protocol (TCP).

The operator wants to provide an attractive service with good end-user experience; therefore the operator is definitely interested in monitoring the performance of the service.

The existing solutions, described above, are either focusing on the performance of a certain subsystem, or considering the overall performance at aggregate level.

The limitation of the counter based approach is that it only provides aggregate statistics of a certain event or procedure. Positioning events can be related neither to a given subscriber or set of subscribers, nor to a specific geographic region.

The drawback of log-based approach is that in multi-vendor environment the collection and processing of the information is not standardized. Moreover, the vendor of the GMLC, LBS and WAP or HTTP gateway nodes may be different, hence the correlation of logs to find a specific event may lead to a cumbersome task.

The disadvantage of active measurements is that it can be performed from only a limited set of terminals in order to keep the induced load low, and only from a limited set of geographic areas. There is also a need to take care of moving the terminals.

The limitation of the single monitoring-point passive measurements is that it provides a partial insight into to LBS system performance, i.e. either only the positioning part or the overall LBS system excluding the details of the positioning, can be considered. In the first case, there is no background information on the requested LBS action, i.e. who and why did the positioning request. In the second case, there is no direct information over the positioning part, because the obtained position is used to index the database and the response includes post-processed information, e.g. a map in image format. Hence the LBS request can be bound neither to a user nor to a geographic location, and it cannot be determined whether positioning or the database performance is the bottleneck.

SUMMARY OF THE INVENTION

In view of the above, the object of the invention is to provide a performance monitoring of a mobile telecommunications network for the operators in which they can detect performance degradation and bottleneck in the network identifying subsystems of poor performance for a specific set of requests initiated by a subscriber or set of subscribers in a specific geographic region.

According to the present invention, this object is achieved by a method, in which passive monitoring is applied for both location-based service and positioning related information which are captured and processed in a monitoring device connected to interfaces of the network, and key performance indicators and/or measures of service usage are calculated from the combination of positioning information and location-based service time response.

Further, the object as outlined above according to the present invention is achieved by a device performing the monitoring of the mobile telecommunications network. The monitoring device comprises a flow demultiplexer, a set of analyzers, a traffic database, a correlator and a calculator.

In yet another aspect, the present invention is directed to a monitoring system applied to Location-based Service, in which nodes of a telecommunications network provide both positioning and location-based service information of a subscriber. In the system a monitoring device is connected to different interfaces of the network. The monitoring device provides key performance indicators and/or measures of service usage relating to the combination of positioning and service response time.

The most important advantage of the invention is that it enables the monitoring of overall service performance (response time, success ratio) of the LBS-requests submitted by active users either of a circuit-switched or a packet-switched telecommunications network e.g. 3GPP GPRS network with respect to both the requesting and requested user, service type, location and the positioning accuracy.

It is also advantageous that the method pinpoints the user perceived performance and network problems and identifies bottlenecks in the service chain of the subsystems participating in the LBS delivery.

Another advantage is that the system according to the present invention monitors the usage of the LBS.

The method itself enables indexing both performance and usage data on the geographical location, thus visualization of the data to show performance problems in a specific region is straightforward, e.g. heat-map.

Compared to active measurements, the monitoring device can be connected only at a single site to the network, and there is no need to maintain a lot of independent measurement endpoints.

Compared to single-point passive measurements, the method provides important details on the request, such as location of the user, achieved accuracy, the usability of the results, beside basic identification of the request and response events.

BRIEF DESCRIPTION OF THE DRAWINGS

In the following, the best mode and preferred embodiments of the present invention will be described with the reference to the drawing in which.

DESCRIPTION OF THE BEST MODE AND PREFERRED EMBODIMENTS

Figure 1:
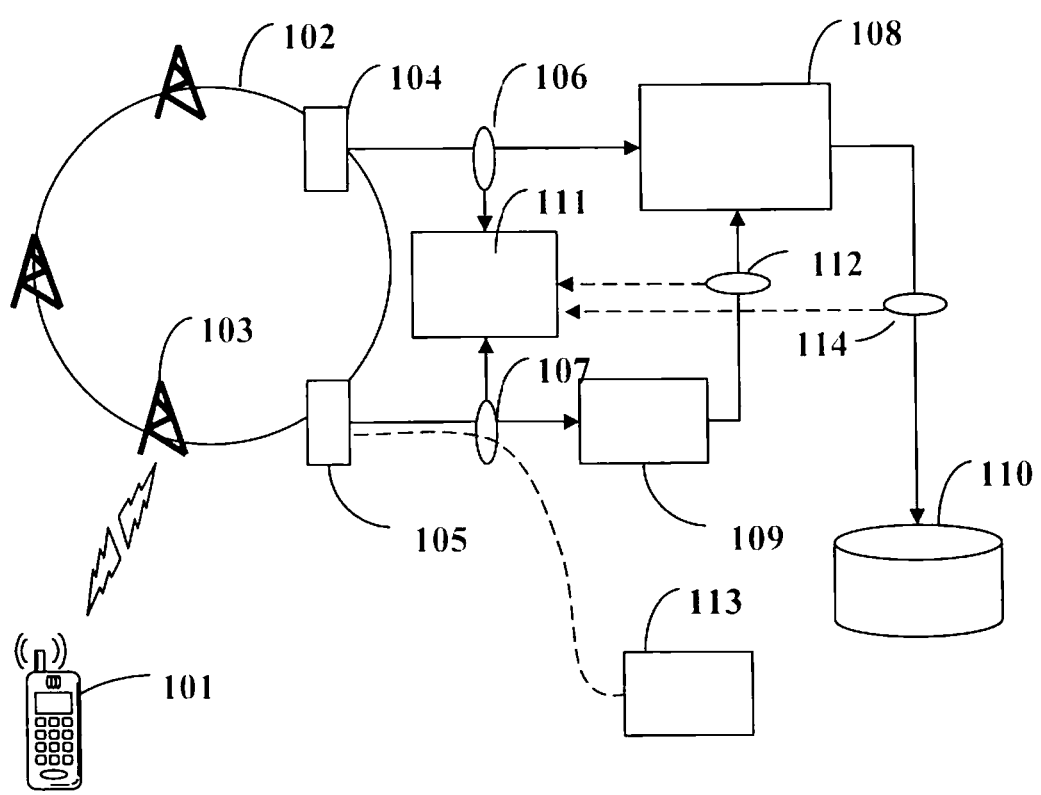
FIG. 1 shows the schematic diagram of the monitoring system applied to 3GPP GPRS mobile network.

In the following the best mode of carrying out the invention as well as preferred embodiments thereof will be described through reference to the drawing.

As shown in FIG. 1 an LBS system 108 is connected to a 3GPP GPRS mobile network 102 having an access network with base stations 103 through two connection points. The first connection point is a GMLC node 104 which is interconnected to the LBS system 108 over a standard 3GPP Le interface 106 using Mobile Location Protocol (MLP). The GMLC node 104 is responsible for authorizing the positioning request for the requested subscriber, and returns the position information obtained from the radio access network. The second connection point is a Gateway GPRS Support Node (GGSN) 105. The GGSN 105 responsible for the transfer procedures between the mobile telecommunications system and an external network. The GGSN 105 is connected to the LBS system 108 through a WAP or HTTP Gateway (GW) node 109 via a GW-LBS interface 112, which uses the HTTP protocol as specified in IETF, RFC2616. The LBS 108 acts as a HTTP Server and the GW 109 is eventually a HTTP proxy with charging capabilities. The subscriber submits the request from a Mobile Station (MS) 101 to the GW 109 via a standard 3GPP Gi interface 107 described in 3GPP TS 23.060, using either the WAP (WTP/WSP) protocols or the HTTP protocol. In case of WAP requests, the GW 109 also translates the HTTP content to the WAP domain. In addition, the LBS system 108 is interconnected with a database server (DB) 110 over a database vendor specific LBS-DB interface 114. A Remote-Authentication-Dial-In-User-Service (RADIUS) server 113 is also involved which is responsible for receiving subscriber connection requests, authenticating the subscriber, and then returning all configuration information.

The basic operation of the system is outlined below. It is assumed that the PDP-context is already activated between the MS 101 and the GGSN 105.

Firstly, MS 101 issues a WAP or HTTP request to a LBS specific Uniform Resource Locator (URL). Then GW 109 identifies the MS 101 and issues the service request to the LBS system 108. In the next step, LBS system 108 determines the Mobile Station Integrated Services Digital Network (MSISDN) number to position and request GMLC. After that GMLC 104 authorizes the positioning request, performs positioning and returns with position information including measurement accuracy. Then LBS system 108 makes a request for DB 110 based on position and requested operation which returns with a list of requested objects within the neighborhood. In the next step, LBS system 108 generates the desired output and signals to the GW 109 to start delivery. Finally, GW 109 delivers the content to the MS 101 while converting to the required format.

The monitoring of this LBS system is carried out by a monitoring device 111 forming a single site which is connected at least to the Le interface 106 and to the Gi interface 107. Positioning information includes data for coordinates, status and duration time of a subscriber. Duration time can be derived from the Le interface 106 by tracing corresponding request-response events. The LBS information includes data for type and response time belonging to a subscriber. Connection to the LBS-GW interface 112 and, or to an LBS-DB interface 114 is optional. The monitoring device performs a passive monitoring, i.e. it does not generate additional traffic in the network. The analysis carried out by the monitoring device 111 is described in FIG. 2.

Figure 2:
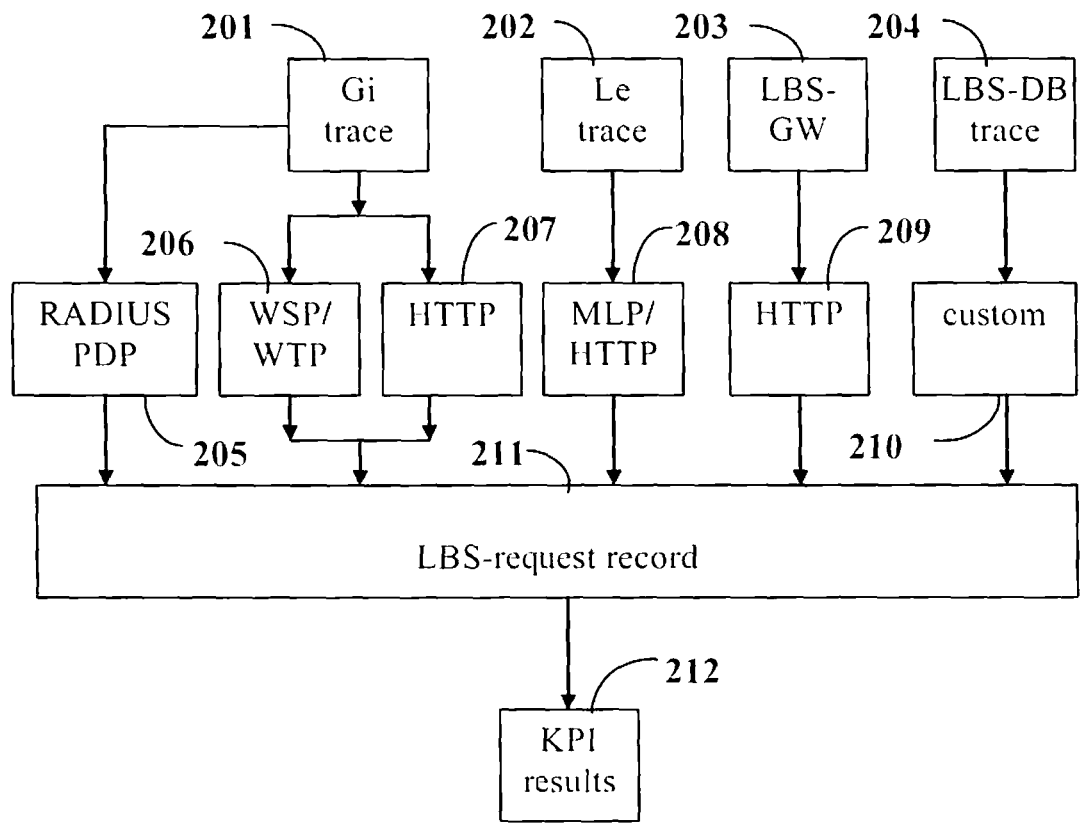
FIG. 2 shows the main steps of monitoring applied to a 3GPP GPRS network.

As shown in FIG. 2, the main steps of monitoring applied to a 3GPP GPRS network offering LBS are as follows:

Gi and Le traces 201, 202 and optionally LBS-GW and/or LBS-DB traces 203, 204 are recorded. Each captured packet is time-stamped in the trace file.

Each trace is processed independently in order to extract all relevant information, i.e. who requested when, what resource with what result. This information is needed to reconstruct the details of an LBS request at each interface. These transactions are stored if all required information is collected or a timer elapsed.

Previously stored transactions are correlated established from different traces to reconstruct the life-cycle of an LBS-request. All valuable timing and status information are determined that are required to calculate Key Performance Indicators (KPIs) and reconstructed LBS-request records are stored.

A set of KPIs are defined and KPI results 212 are calculated over a set of reconstructed LBS-request records 211.

The analysis outlined above is detailed in the followings.

Out of the Gi trace 201, the signaling RADIUS traffic and the relevant user traffic is processed. From RADIUS traffic, the start and the end of the Packet Data Protocol (PDP)-contexts 205 are determined, which allows the association of the user traffic to a subscriber identified by the MSISDN number. From user traffic, the WAP Wireless Session Protocol and Wireless Transaction Protocol (WTP/WSP) 206 or HTTP requests 207 are identified first. Depending on the software of MS, one of the protocols is used. This is eventually a flow demultiplexing task, which will be discussed later. Out of these requests, the ones targeted to run an LBS service request are filtered, based on the URL of the LBS server carried in the payload of the packets.

From the Le trace 202, the MLP requests 208 need to be isolated first with flow demultiplexing. Each MLP request carries the MSISDN number of the corresponding subscriber; hence the correlation to the Gi request can be easily performed. The positioning related information e.g. position, accuracy, requested Quality of Service (QoS), need to be stored as well.

In the LBS-GW trace 203 (if available), HTTP requests 209 contain some meta-information or the original client host in the request header. The isolation of these requests allows correlating them to the Gi and MLP requests.

If the LBS-DB trace 204 is available, the database queries supposed to be identified 210 using vendor-specific protocol.

Once the required transactions are available to reconstruct an LBS-record 211, it shall be performed. The LBS-record 211 stores all relevant information required for the KPI analysis. This includes the subscriber, the position with accuracy, response status of each request and the timing information of the requests.

The actual values of the KPI results 212 are calculated from the reconstructed LBS-request records 211. The calculation is considered as a simple procedure over a selected set of records, such as counting specific events or averaging response times.

Figure 3:
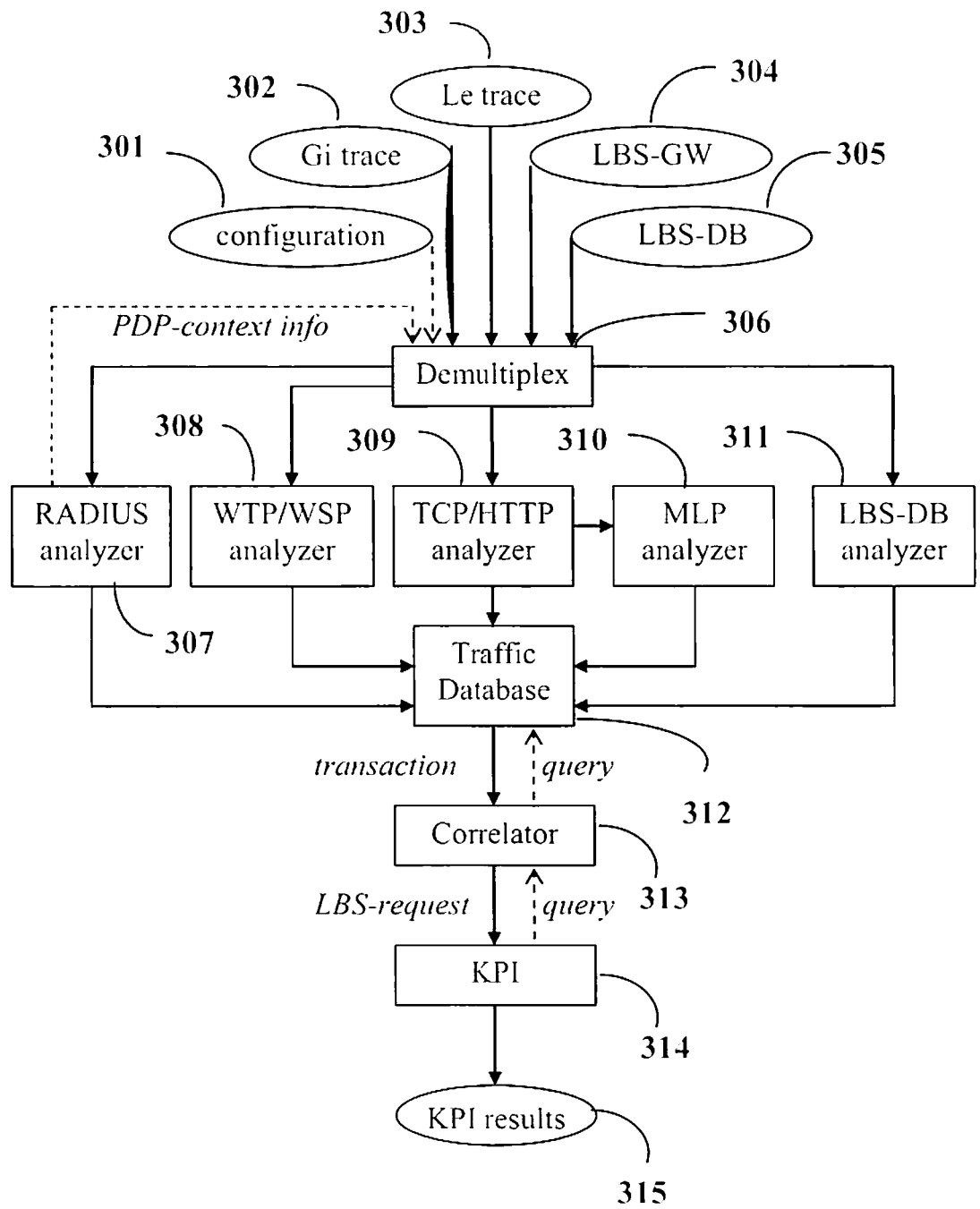
FIG. 3 shows an advantageous architecture of the monitoring device.

An advantageous architecture of the monitoring device that implements the monitoring method is shown in FIG. 3. It comprises a flow demultiplexer 306, a RADIUS analyzer 307, a WTP/WSP analyzer 308, a TCP/HTTP analyzer 309, an MLP analyzer 310, a traffic database 312, a correlator 313, a KPI calculator 314. and an optional LBS-DB analyzer 311.

The flow demultiplexer 306 takes Gi and Le traffic traces 302, 303 and configuration parameters 301 as input. Optionally, LBS-GW and/or LBS-DB traffic traces 304, 305 are also taken. It should be noted that some information on what can be found in the traffic trace cannot be obtained from the trace itself, but has to be given as configuration information (dashed arrow). For example the URL of the LBS server needs to be specified. The flow demultiplexer 306 recognizes packet types based on the protocol type, and on the specified port numbers. For flow demultiplexing the flows, the source and destination address, the source and destination port, the protocol and some protocol specific header fields e.g. transaction id of WTP packets of the packets are used.

The RADIUS analyzer 307 is responsible for interpreting the RADIUS packets for PDP-context establishment procedure and finding IP addresses for the newly appearing subscribers. It receives packets from the flow demultiplexer 306, sends back the {subscriber ID, IP address} pair (dotted arrow) to the flow demultiplexer 306, and sends transactions to the traffic database 312. Transactions contain information that needs to be stored in the traffic database 312, e.g., subscriber ID, IP address, start time and length of the user session, other PDP context parameters, e.g. on requested quality of service, etc.

The WTP/WSP analyzer 308 is responsible for decoding WTP and WSP protocols used for transporting WAP 1.1 traffic.

The TCP/HTTP Analyzer 309 is responsible for decoding HTTP requests in a TCP connection. Whenever MLP messages are recognized, they are forwarded to the MLP analyzer 310.

The MLP analyzer 310 is responsible for extracting subscriber and positioning information from the MLP requests conveyed in HTTP protocol.

The LBS-DB analyzer 311 is an optional module responsible for decoding database query information coupled with an MLP or LBS request.

The traffic database 312 stores the records received from the analyzer modules 307-311 and the flow demultiplexer 306. The traffic database 312 can be queried by the KPI calculator 314 and appropriate database records can be obtained for e.g., KPI results 315. In the simplest case, the traffic database 312 can be a file that stores one record (flow, session, etc.) per line together with the identifiers.

The correlator 313 performs the reconstruction of LBS-requests from the different transactions.

The KPI calculator 314 sends queries to the correlator 313 and calculates KPIs 315 based on the LBS-request records received.

Figure 4:
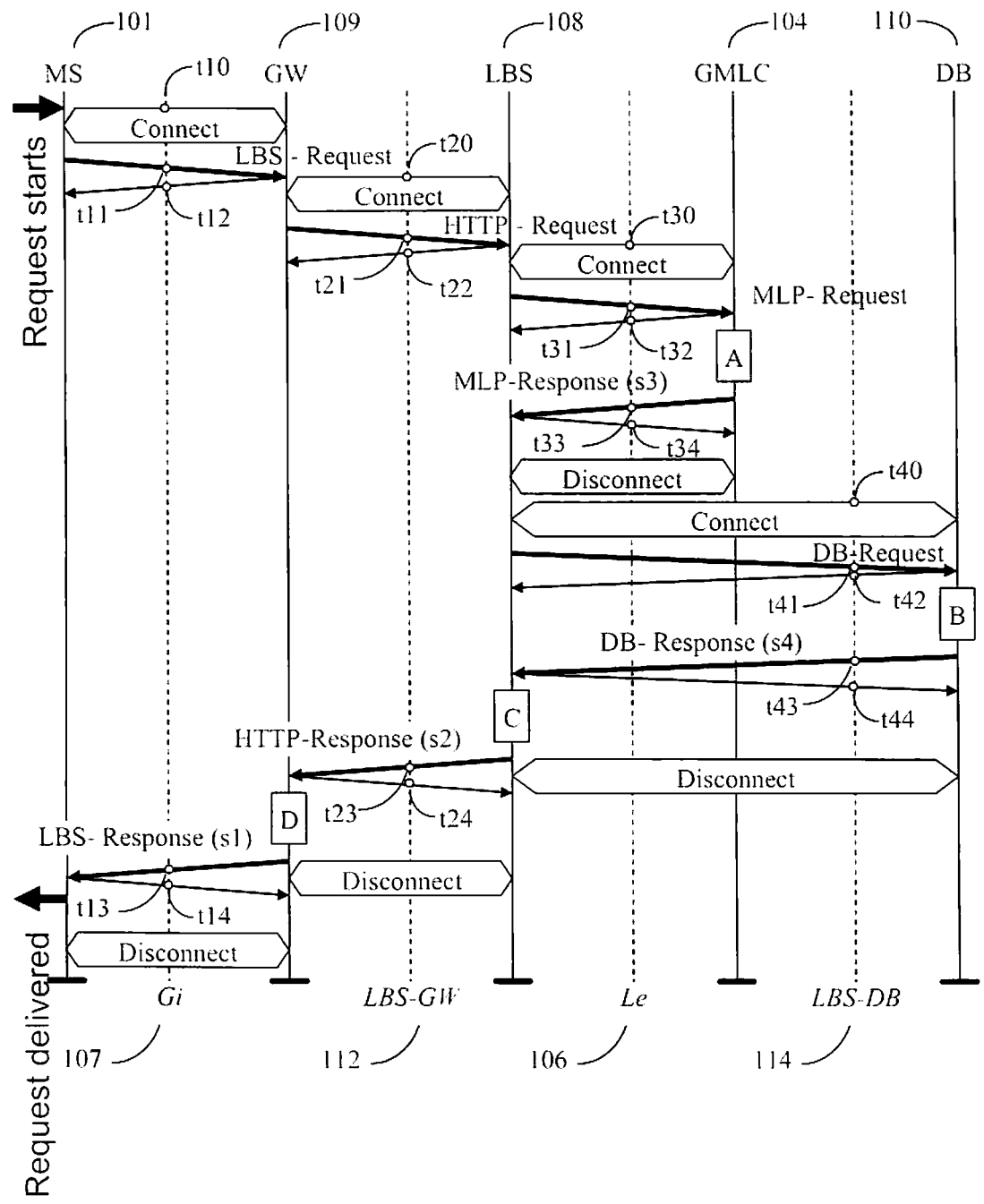
FIG. 4 shows the sequence diagram of an exemplary interaction of a LBS-request.

An exemplary protocol interaction of an LBS-request according to the invention is shown in FIG. 4. The major processing stages are denoted with capital letters, such as A—Positioning, B—Database Look-up, C—Assembly of response, D—Format conversion. Vertical solid lines represent the nodes of FIG. 1, such as MS 101, GW 109, LBS system 108, GMLC 104 and DB 110, vertical dashed lines belong to interfaces, such as Gi interface 107, LBS-GW interface 112, Le interface 106 and LBS-DB interface 114. The monitored events are indicated with a small ball and with a timestamp t11-t44. The sequence of events passes from top to down. Bold arrow at the upper left corner indicates the request start, and the bottom left bold arrow shows the delivered request. By tracking such protocol events that are correlation with terminal events, important measures can be obtained. Therefore these measures are indicators of the end-to-end performance, and in some cases, when the terminal overhead can be neglected, they are also good estimators of the end-to-end performance measures. At each monitored interface (where i=1, 2, 3, 4), the timestamps of event j (where j=0, 1, 2, 3, 4) is denoted with $t_{ij}$ and the response status to the request is denoted $s_i$. The summary of the events and the interfaces used for KPI definition is collected in the table below. Whenever a timestamp is missing, it is set to zero for indication.

| i | Interface | j | Event |
|---|---|---|---|
| 1 | Gi | 0 | Start of connection setup |
| 2 | LBS-GW | 1 | Start of request submission |
| 3 | Le | 2 | End of request submission |
| 4 | LBS-DB | 3 | Start of response delivery |
|   |   | 4 | End of response delivery |

Key Performance Indicators (KPI)

All KPI definitions below are examples for characterizing the LBSs and consider only a find-nearest-point-of-Interest (POI) procedure. The base sample set for each KPI can be conditioned on a set of users, a given geographic area, the LBS application type and whether the user requested someone else.

LBS Service Accessibility Ratio: the ratio of the successfully submitted requests ($t_{12}$>0) and the total number of service requests ($t_{10}$>0).

LBS Service Retainability Ratio: the ratio of the successfully delivered responses ($t_{14}$>0) and the total number of successfully submitted requests ($t_{12}$>0).

LBS Service Completion Ratio: the ratio of the successfully delivered responses ($t_{14}$>0) and the total number of service requests ($t_{10}$>0).

LBS Service Completion Time: the time between sending the WAP or HTTP request and reception of the response if it contains valid information. This is calculated as $t_{14}-t_{10}$ if $s_1=200$ (where 200 is the OK status of the HTTP protocol).

LBS Service Failure Report Time: the time between sending the WAP or HTTP request and reception of the response if it contains valid information. This is calculated as $t_{14}-t_{10}$ if $s_1 \neq 200$, where 200 is the OK status of the HTTP protocol.

Positioning Completion Time: the time between sending the MLP request and reception of the response if it contains valid information. This is calculated as $t_{14}-t_{10}$ if $s_1=200$, where 200 is the OK status of the HTTP protocol.

Positioning Failure Report Time: the time between sending the MLP request and reception of the response if it contains valid information. This is calculated as $t_{14}-t_{10}$ if $s_1 \neq 200$, where 200 is the OK status of the HTTP protocol.

Measures Characterizing Service Usage

LBS Volume Share: the volume ratio of the LBS traffic volume (expressed in bytes) to the total GPRS traffic volume at the Gi interface.

LBS Penetration Ratio: the ratio of the number of LBS enabled subscribers and the active GPRS subscribers, who were activating at least one PDP-context during the measurement period. This measure can be obtained as the number of subscribers sending at least one LBS-request over the number of subscribers having at least one successful PDP-context. LBS Call Frequency: the average amount of time between two successive LBS-requests from the same subscriber.

Figure 5:
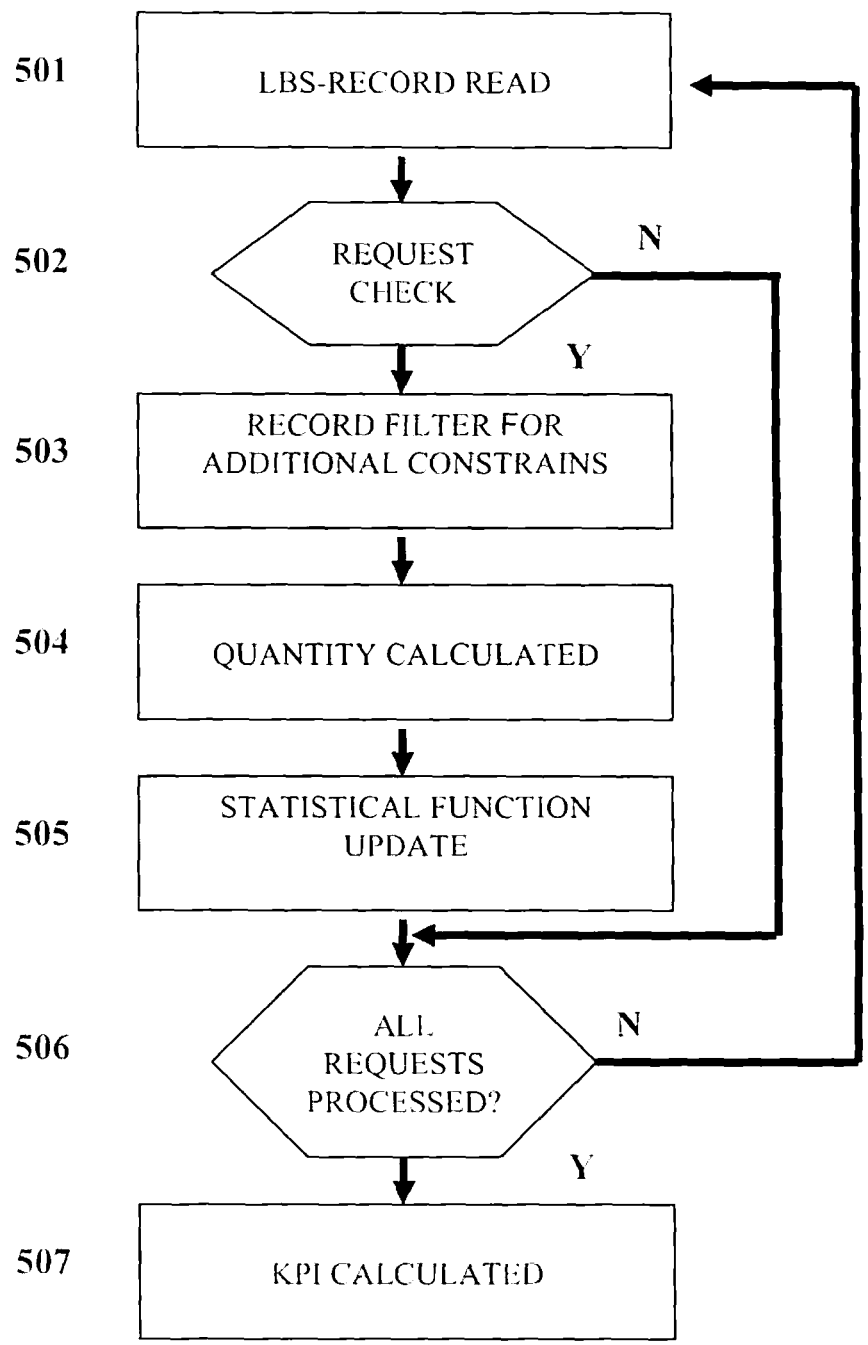
FIG. 5 shows the flowchart of the procedure for calculating key performance indicators and usage measures.

The procedure for calculating the above listed key performance indicators and usage measures is shown in FIG. 5.

In step 501, the next LBS-record from the traffic database is read.

In step 502, it is checked whether this request is of the type, which the KPI is about.

In step 503, records are filtered optionally by additional constraints to focus on a subset of the subscribers, e.g. by terminal type, GPRS/EDGE capabilities.

In step 504, the quantity defined by the KPI for the particular call is calculated.

In step 505, the statistical function is updated with the value (e.g., add the value to an aggregation counter), and increase the counter calculating the number of eligible calls for the KPI.

In step 506, it is decided if all the requests are processed. If not, the procedure from step 501 is repeated.

In step 507, the KPI value is calculated by evaluating the statistical function that is relevant for the KPI, e.g., if the KPI is an average value, divide the value of the aggregation counter with the count of the eligible calls.

As it was demonstrated in the drawings, the monitoring system can be connected at standardized interfaces to the 3GPP GPRS network. The method is independent from the radio network, hence it allows extending the method to future radio technologies without any change. Furthermore, the usage of standardized 3GPP interfaces allows the monitoring system to be deployed in a multi-vendor network.

Although the preferred embodiment of the present invention has been illustrated in the accompanying drawing and described in the detailed description related to a 3GPP GPRS telecommunications network, it is understood that the invention is not limited to a packet switched network only, but is capable for any telecommunications network having nodes providing both positioning information and location-based service information, such as any circuit switched network, without departing from the spirit of the invention as set forth and defined by the following claims.

What is claimed is:

1. A method for monitoring the performance of a location-based service in a mobile telecommunications network including nodes providing both positioning and location-based service information relating to a subscriber, the method comprising:
   performing passive monitoring of the location-based service by a monitoring device connected to interfaces of the network;
   capturing both location-based service and positioning related information by the monitoring device;
   processing the captured information in the monitoring device;
   calculating, by the monitoring device, key performance indicators and/or measures of service usage information relating to the combination of positioning information and location-based service response time.

2. The method of claim 1, wherein positioning related information is captured at an interface of a node responsible for authorizing the positioning request for the requested subscriber, and returning the position information obtained from a radio access network.

3. The method of claim 1, wherein location-based service information is captured at an interface of a node responsible for transfer procedures between the mobile telecommunications network and an external network.

4. The method of claim 3, wherein location-based service information is captured at a further interface of a node using Hypertext Transfer Protocol.

5. The method of claim 1, wherein the mobile telecommunications network is a General Packet Radio Service (GPRS) network.

6. The method of claim 1, wherein the mobile telecommunications network is a CDMA2000 network.

7. The method of claim 1, wherein the positioning information includes data for coordinates, status and duration time of a subscriber.

8. The method of any claim 1, wherein the service information includes data for type and response time belonging to a subscriber.

9. The method of claim 1, wherein the calculation of key performance indicators comprises the steps of
   reading the next LBS-record from a traffic database;
   checking whether this request is of the type, which the KPI is about;
   calculating the quantity defined by the key performance indicator for the particular call;
   updating the statistical function with the value, and increasing the counter calculating the number of eligible calls for the KPI;
   deciding if all the requests are processed , and if not, reading the next LBS-record from a traffic database is repeated ;

calculating the value of the key performance indicator by evaluating the statistical function that is relevant for the KPI.

10. The method of claim 1, wherein the calculation of key performance indicators comprises the further steps of filtering records by additional constraints to focus on a subset of the subscribers.

11. A device for monitoring the performance of a location-based service in a mobile telecommunications network including nodes providing both positioning and location-based service information relating to a subscriber, the monitoring device connected to interfaces of the network, and the monitoring device comprising:
   a flow demultiplexer receiving traffic trace and configuration parameters;
   a set of analyzers connected to the demultiplexer;
   a traffic database storing records of the analyzers ;
   a correlator performing the reconstruction of local based-service requests from the different transactions; and
   a calculator sending queries to the correlator and calculating Key Performance Indicators based on the local based-service request records received.

12. The device of claim 11, wherein the flow demultiplexer is arranged to recognize packet types based on the protocol type, and on the specified port numbers.

13. The device of claim 11, wherein the set of analyzers comprises a RADIUS analyzer interpreting RADIUS packets for PDP-context establishment procedure and finding IP addresses for the newly appearing subscribers.

14. The device of claim 11, wherein the set of analyzers comprises a WTP/WSP analyzer decoding WTP and WSP protocols.

15. The device of claim 11, wherein the set of analyzers comprises a HTTP analyzer decoding HTTP requests in a TCP connection.

16. The system of claim 15, wherein the interface carrying location-based service information is the Gi interface and an LBS-GW interface.

17. The device of claim 11, wherein the set of analyzers comprises an MLP analyzer extracting subscriber and positioning information from the MLP requests conveyed in HTTP protocol.

18. The device of claim 11, wherein the set of analyzers comprises an LBS-DB analyzer decoding database query information coupled with an MLP or LBS request.

19. A system for monitoring the performance of a location-based service in a mobile telecommunications network including nodes providing both positioning and location-based service information relating to a subscriber, the system comprising:
   a monitoring device connected to interfaces of the network carrying the positioning and the location-based service information relating to the location of the subscriber;
   wherein the monitoring device is arranged to:
      passively monitor the location-based service;
      capture both location-based service and positioning related information;
      process the captured information; and
      calculate key performance indicators and/or measures of service usage information relating to the combination of positioning and location-based service response time.

20. The system of claim 19, wherein the interface carrying positioning information is an Le interface of a 3GPP GPRS network.

21. The system of claim 19, wherein the interface carrying location-based service information is a Gi interface of a 3GPP GPRS network.

22. The system of claim 19, wherein the key performance indicator is a ratio of the successfully submitted requests and the total number of service requests.

23. The system of claim 19, wherein the key performance indicator is a ratio of the successfully delivered responses and the total number of successfully submitted requests.

24. The system of claim 19, wherein the key performance indicator is a ratio of the successfully delivered responses and the total number of service requests.

25. The system of claim 19, wherein the key performance indicator is a time between sending the WAP or HTTP request and reception of the response if it contains valid information.

26. The system of claim 19, wherein the key performance indicator is a time between sending the WAP or HTTP request and reception of the response if it contains valid information.

27. The system of claim 19, wherein the key performance indicator is a time between sending the MLP request and reception of the response if it contains valid information.

28. The system of claim 19, wherein the key performance indicator is a time between sending the MLP request and reception of the response if it contains valid information.

29. The system of claim 19, wherein the measure of service usage is a volume ratio of the LBS traffic volume to the total GPRS traffic volume at the Gi interface.

30. The system of claim 19, wherein the measure of service usage is a ratio of the number of LBS enabled subscribers and the active GPRS subscribers, who were activating at least one PDP-context during the measurement period.

31. The system of claim 19, wherein the measure of service usage is an average amount of time between two successive location-based service requests from the same subscriber.

* * * * *